US010356980B2

(12) United States Patent
Rotole et al.

(10) Patent No.: US 10,356,980 B2
(45) Date of Patent: Jul. 23, 2019

(54) WORK VEHICLE WITH WHEEL/TRACK CROP SWATH AVOIDANCE

(71) Applicant: Deere & Company, Moline, IL (US)

(72) Inventors: David V. Rotole, Bloomfield, IA (US); Kellen B. Hill, Ottumwa, IA (US); Joshua D. Graeve, Ottumwa, IA (US); Roger D. Stephenson, Ottumwa, IA (US); Stephen K. Parsons, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 64 days.

(21) Appl. No.: 15/665,182

(22) Filed: Jul. 31, 2017

(65) Prior Publication Data

US 2018/0116115 A1 May 3, 2018

Related U.S. Application Data

(60) Provisional application No. 62/414,238, filed on Oct. 28, 2016.

(51) Int. Cl.
*A01D 41/12* (2006.01)
*A01F 29/01* (2006.01)
(Continued)

(52) U.S. Cl.
CPC ......... *A01D 41/1243* (2013.01); *A01D 45/30* (2013.01); *A01D 78/14* (2013.01);
(Continued)

(58) Field of Classification Search
CPC .... A01D 41/1243; A01D 78/14; A01D 45/30; A01D 47/00; A01D 57/20; A01D 75/30;
(Continued)

(56) References Cited

U.S. PATENT DOCUMENTS 3,910,019 A * 10/1975 Schlittler ........... A01D 78/1078
56/367
3,911,649 A * 10/1975 Scarnato ................ A01D 57/28
56/1
(Continued)

FOREIGN PATENT DOCUMENTS

DE 2753102 A1 7/1978
FR 2741506 A1 5/1997
(Continued)

OTHER PUBLICATIONS

John Deere, Balers: 9 Series Round Balers, Small Square Balers, 900 Series Round Balers, Apr. 2016.
(Continued)

*Primary Examiner* — Arpad Fabian-Kovacs
(74) *Attorney, Agent, or Firm* — Klintworth & Rozenblat IP LLP

(57) ABSTRACT

A work vehicle for working a swath of crop has at least one ground-engaging wheel or track mounted to the work vehicle and movable in a travel direction along a tread path. A first redistribution device is mounted to the work vehicle to move crop that is ahead of the at least one ground-engaging wheel or track relative to the travel direction. A second redistribution device is mounted to the work vehicle to move crop that is behind the at least one ground-engaging wheel or track relative to the travel direction. The first redistribution device is configured to open the swath of crop along substantially only the tread path ahead of the at least one ground-engaging wheel or track relative to the travel direction, and the second redistribution device is configured to close the swath of crop along the tread path behind the at least one ground-engaging wheel or track relative to the travel direction.

20 Claims, 7 Drawing Sheets

(51) Int. Cl.
  *A01D 45/30* (2006.01)
  *A01D 78/14* (2006.01)
  *A01B 79/00* (2006.01)
  *A01F 12/40* (2006.01)
  *A01F 12/46* (2006.01)
  *A01D 47/00* (2006.01)

(52) U.S. Cl.
  CPC ............ *A01F 29/01* (2013.01); *A01B 79/005* (2013.01); *A01D 47/00* (2013.01); *A01F 12/40* (2013.01); *A01F 12/46* (2013.01); *G05D 2201/0201* (2013.01)

(58) Field of Classification Search
  CPC ........ A01D 84/00; A01D 43/04; A01D 57/30; A01F 29/01; A01F 12/46; A01F 12/40; G05D 2201/0201; A01B 79/005; A01B 37/00; A01B 49/02; A01B 59/064
  See application file for complete search history.

(56) References Cited

U.S. PATENT DOCUMENTS

| | | | | |
|---|---|---|---|---|
| 4,274,247 | A * | 6/1981 | Schmidt | A01D 57/00 56/14.4 |
| 4,807,429 | A | 2/1989 | Roberts | |
| 5,155,986 | A * | 10/1992 | Kelderman | A01D 78/144 56/365 |
| 5,163,277 | A * | 11/1992 | Fransgaard | A01D 78/12 56/15.5 |
| 5,845,717 | A * | 12/1998 | Gillespie | A01B 37/00 172/833 |
| 6,000,206 | A * | 12/1999 | Case | A01F 15/08 100/88 |
| 6,164,051 | A * | 12/2000 | van der Lely | A01D 57/20 56/367 |
| 6,205,757 | B1 * | 3/2001 | Dow | A01D 57/20 56/366 |
| 6,508,050 | B1 * | 1/2003 | Krone | A01D 43/107 56/192 |
| 7,028,459 | B2 * | 4/2006 | Lohrentz | A01D 57/20 56/192 |
| 8,342,253 | B2 * | 1/2013 | Gisler | A01B 79/00 172/1 |
| 2002/0170723 | A1 * | 11/2002 | Krone | A01B 63/106 172/452 |
| 2003/0024228 | A1 | 2/2003 | Franet | |
| 2005/0252183 | A1 * | 11/2005 | Hironimus | A01D 57/20 56/6 |
| 2017/0105330 | A1 * | 4/2017 | Mashburn | A01B 59/064 |
| 2018/0077865 | A1 * | 3/2018 | Gallmeier | A01D 41/1278 |

FOREIGN PATENT DOCUMENTS

| | | |
|---|---|---|
| WO | 2010003421 A1 | 1/2010 |
| WO | 2011122939 A1 | 10/2011 |

OTHER PUBLICATIONS

John Deere, Windrowers: W100 Series, W200 Series, Aug. 2016.
Krone, Big M 420: SP High-Performance Mower Conditioner, Feb. 2016.
European Patent Office, Extended European Search Report for Application No. 17197990.9-1006 dated Feb. 28, 2018.

* cited by examiner

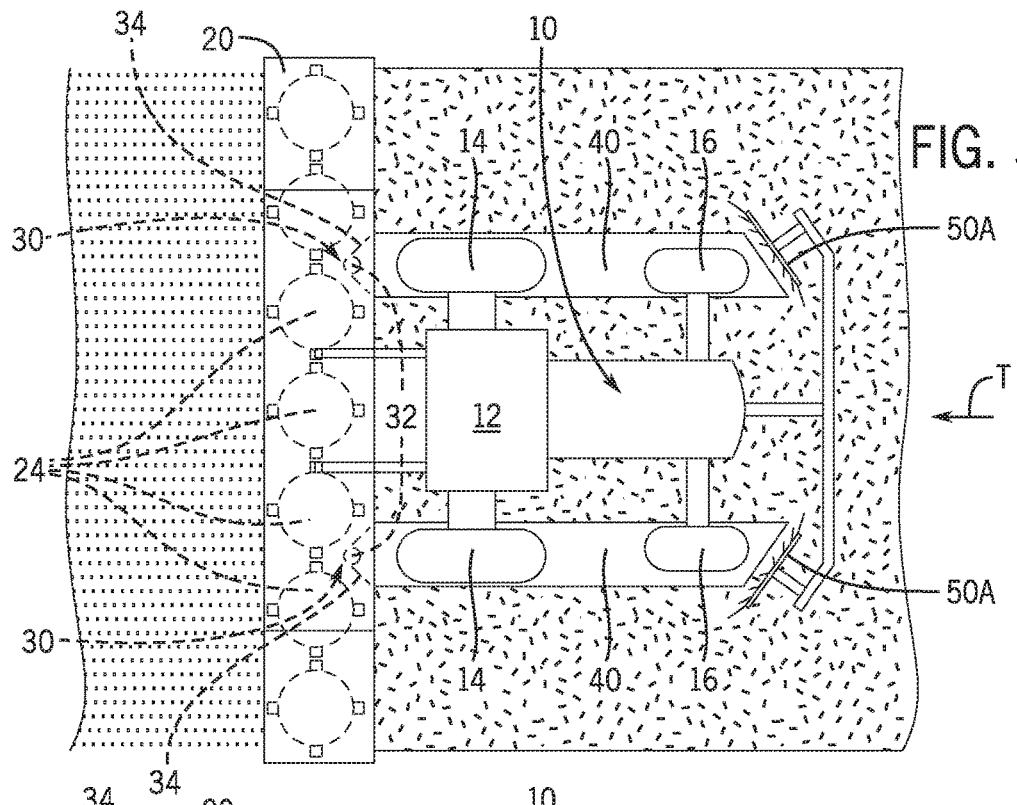
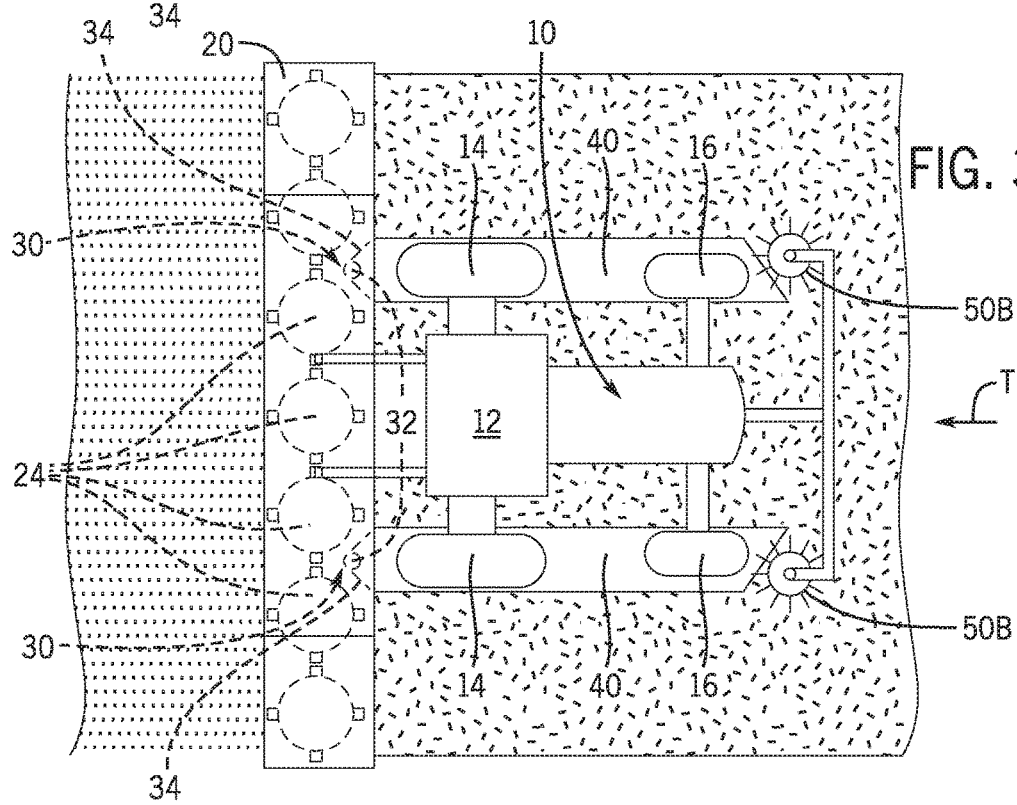

WORK VEHICLE WITH WHEEL/TRACK CROP SWATH AVOIDANCE

CROSS-REFERENCE TO RELATED APPLICATION(S)

This application claims priority to U.S. application Ser. No. 62/414,238, filed Oct. 28, 2016.

STATEMENT OF FEDERALLY SPONSORED RESEARCH OR DEVELOPMENT

Not applicable.

FIELD OF THE DISCLOSURE

This disclosure relates to work vehicles, and in particular to crop-working and other agricultural vehicles.

BACKGROUND OF THE DISCLOSURE

Various work vehicles are designed to work strips or swaths of crop fields. For example, various spraying, planting and tillage implements may be outfitted with various shanks, spikes, tines and disks to open and close or rake the ground and/or crop to complete various ground- and/or crop-working treatments (e.g., seeding, soil aeration, nutrient application, and so on). Windrowers, mower-conditioners and other cutting machines may have large cutting heads (carried either at the front or rear of the vehicle) that cut down and disperse various crops (e.g., grasses, hays, legumes, herbs or other cultivated plants). Harvesting machines of various types (e.g., combines, cotton harvesters, sugarcane harvesters and the like) may have large headers with various blades, spindles, drums and other components to cut, pull or otherwise separate the desired constituents of the crop from the ground and/or other residual parts of the plant.

All of these machines, being either self-powered vehicles or towed implements, have ground-contacting wheels or tracks to support the machines off the ground, generally away from the crop, and to propel or aid in propelling the machines in a travel direction along the crop field. The machines may be constructed in a configuration that reduces damage to crop from being contacted by the machine body or the wheels or tracks. For example, self-powered sprayers may have large diameter wheels that give the machine high ground-clearance as needed to pass over tall crop. Alternatively, the machines may be adapted to process the crop in a manner that limits unintended contact with the machines. For example, windrowers and other cutting machines may have wide wheel bases between the wheels or tracks of which cut crop may be laid out in windrows for later retrieval and processing (e.g., by a baler implement). Since various different machines of various wheel bases (or other key dimension) may work the same crop, the windrows may be formed in narrow strips to leave wide areas of open and unused field between the windrows on which ride the wheels or tracks of the machines. Processing the crop in ways such as this may be inefficient in certain respects.

SUMMARY OF THE DISCLOSURE

The disclosure provides a work vehicle for working a wide swath of crop without its ground-engaging wheels or tracks treading upon or diminishing the width of a side swath of cut crop.

One aspect the disclosure provides a work vehicle for working a swath of crop in which the work vehicle has at least one ground-engaging wheel or track mounted to the work vehicle and movable in a travel direction along a tread path. A first redistribution device is mounted to the work vehicle to move crop that is ahead of the at least one ground-engaging wheel or track relative to the travel direction. A second redistribution device is mounted to the work vehicle to move crop that is behind the at least one ground-engaging wheel or track relative to the travel direction. The first redistribution device is configured to open the swath of crop along substantially only the tread path ahead of the at least one ground-engaging wheel or track relative to the travel direction, and the second redistribution device is configured to close the swath of crop along the tread path behind the at least one ground-engaging wheel or track relative to the travel direction.

Another aspect the disclosure provides a work vehicle for working a swath of crop in which the work vehicle has a pair of front ground-engaging wheels or tracks mounted to the work vehicle and movable in a travel direction along parallel tread paths and a pair of rear ground-engaging wheels or tracks mounted to the work vehicle to be movable in the travel direction along the tread paths. A pair of parting devices is mounted to the work vehicle to move crop that is ahead of the front ground-engaging wheels or tracks relative to the travel direction. A pair of converging devices is mounted to the work vehicle to move crop that is behind the rear ground-engaging wheels or tracks relative to the travel direction. The parting devices are configured to open the swath of crop along substantially only the tread paths ahead of the front ground-engaging wheels or tracks relative to the travel direction, and the converging devices are configured to close the swath of crop along the tread paths behind the rear ground-engaging wheels or tracks relative to the travel direction.

Yet another aspect the disclosure provides a work vehicle train for working a swath of crop in which the vehicle train includes a lead work vehicle and a follower work vehicle. The lead work vehicle has at least one ground-engaging wheel or track mounted to the lead work vehicle and movable in a travel direction along a lead tread path. A parting device is mounted to the lead work vehicle to move crop that is ahead of the at least one ground-engaging wheel or track of the lead work vehicle relative to the travel direction. A converging device is mounted to the lead work vehicle to move crop that is behind the at least one ground-engaging wheel or track of the lead work vehicle relative to the travel direction. The parting device is configured to open the swath of crop along substantially only the lead tread path ahead of the at least one ground-engaging wheel or track of the lead work vehicle relative to the travel direction, and the converging device is configured to close the swath of crop along the lead tread path behind the at least one ground-engaging wheel or track of the lead work vehicle relative to the travel direction. The follower work vehicle has at least one ground-engaging wheel or track mounted to the follower work vehicle and movable in the travel direction along a follower tread path. An auxiliary parting device is mounted to at least one of the lead work vehicle and the follower work vehicle and is configured to open the swath of crop along substantially only the follower tread path ahead of the at least one ground-engaging wheel or track of the follower work vehicle relative to the travel direction.

The details of one or more embodiments are set forth in the accompanying drawings and the description below.

Other features and advantages will become apparent from the description, the drawings, and the claims.

BRIEF DESCRIPTION OF THE DRAWINGS

FIGS. 3A-3F are top schematic views showing the example windrower of FIG. 2 with various alternative converging devices;

Like reference symbols in the various drawings indicate like elements.

DETAILED DESCRIPTION

Figure 1:
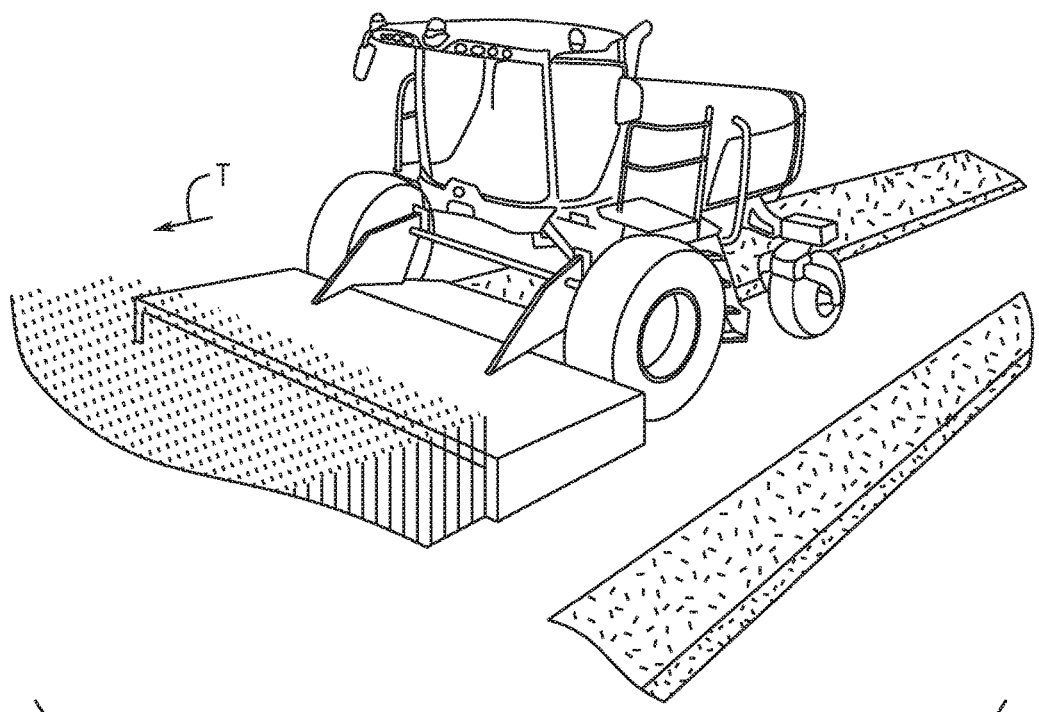
FIG. 1 is a perspective view of an example prior art work vehicle in the form of a windrower having a cutting head and configured to form conventional windrows sized in the transverse direction normal to the travel direction to fit inside of the wheel base (i.e., between left and right side wheels)

The following describes one or more example embodiments of the disclosed crop swath wheel/track avoidance system for crop-working vehicles, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Also, in detailing the disclosure, terms of direction and orientation, such as "ahead," "front," "forward," "aft," "lateral," "horizontal," and "vertical" may be used. Such terms are defined, at least in part, with respect to the direction in which the work vehicle or implement travels during use. The terms "ahead," "forward" and the abbreviated term "fore" (and any derivatives and variations) refer to a direction corresponding to the travel direction of the machine (i.e., generally in a direction following a straight line from a rear wheel to a front wheel of the machine (or from right to left in the views of the drawings as indicated by the arrow "T"), while the terms "behind," "rear," "rearward" and "aft" (and derivatives and variations) refer to an opposing direction. The term "fore-aft" direction or axis may also reference a direction or axis extending in fore and aft directions. By comparison, the term "transverse" or "lateral" may refer to a direction or axis that is perpendicular to the fore-aft axis and extends in a horizontal plane; that is, a plane containing both the fore-aft and transverse or lateral axes. The term "vertical," as appearing herein, refers to an axis or a direction orthogonal to the horizontal plane containing the fore-aft and transverse or lateral axes.

Furthermore, reference is made herein to "crop" and "crop material." It should be understood that these terms include conventional cultivated plants that are grown for food and common in agrarian market segments, such as various grasses, grains, fruits and vegetables, for consumption by either humans or animals. It should be understood, however, that other inedible plants may also be considered as crop or crop material, particularly, but not necessarily, if there is a commercial value in its harvesting. These plants include one or more constituent parts of the plants, including those parts that may be desirable for harvesting as well as those parts that are discarded in the harvesting operation and/or remain as residual plant material for reincorporation with the ground. Such plants, whatever their form, may be worked by a machine in a strip or "swath" that may include the crop material that has been separated from the ground or remains connected to the ground by its roots or otherwise. It should further be understood that either the term "crop" or "swath" (or both) may encompass the ground or soil of the field itself in which the plants are cultivated, or in some cases the nutrient rich soil (or soil sub-components) cultivated for its own harvesting (e.g., for use as potting soil).

As introduced above, any for the various machines used in modern agricultural endeavors typically must physically interact with the crops to perform harvesting operations (e.g., cutting, picking, stripping, baling, and so on). One goal in the design of such machines is to facilitate efficient harvesting (e.g., by increasing the crop yield, reducing harvesting time, etc.). Another goal, or perhaps a part of the formerly stated goal, is to minimize unintended interactions of the machine with the crop, particularly those interactions that may cause damage to the crop, or in some way reduce the efficiency of the harvesting operation.

As one example, windrowers (such as depicted in FIG. 1) and other cutting machines may have wide wheel bases between the wheels or tracks of which cut crop may be laid out in windrows for later retrieval and processing (e.g., by a baler implement). The width of the windrows may be intentionally limited in this way to prevent the wheels of the machine from running over the crop after it is cut, which may lead to crop damage or degradation in various ways. To keep yield as high as possible per pass of the machine the cut crop may be converged into the relatively narrow windrow which increases the stack height of the windrow. The narrow windrows leave wide swaths of open (and thus unutilized) field between the windrows, such as depicted in FIG. 1. Also, while some of the height of the windrows may be advantageous in improving air flow through the windrow that enhances dry down of the crop, and thereby, speeds harvest time, given the several layers of crop in the windrow, it is possible for the crop at or near the top of the windrow to be bleached or otherwise succumb to sun damage. On the other hand, the crop at or near the bottom of the windrow may be slower to dry. Moist or otherwise insufficiently or unevenly dry crop may lead to mold or other nutrient damage to the crop. Thus, conventional windrows may present a conundrum as to how long to wait before the cut crop is harvested. Moreover, in certain climates there may be a relatively narrow window in which the weather is suitable for crop drying. Further, in any event, harvesting delays may lead to pecuniary or other concerns should the crop not be harvested for timely delivery to the distributor or consumer/end user.

To address these and like concerns, this disclosure provides a crop swath wheel/track avoidance system for crop-working vehicles. In certain embodiments, the system provides one or more first crop redistribution devices (e.g., parting devices) mounted to a work vehicle to clear a narrow path for its wheels or tracks. As used herein, this path may be referred to as a "tread path" or a "wheel track," which will be understood to refer to the narrow (in the transverse direction) strip of field in which the machine's wheels or tracks contact the ground as the vehicle traverses the field in the travel direction. The cleared strips of the tread paths are substantially more narrow than certain conventional windrowers that may leave swaths of open field that are wider than the windrows of cut crop (see FIG. 1). It may be referred to herein that the crop is cleared along "substantially only the tread path" by which this phrase means that crop clearing in the swath has a dimension in the transverse direction (or width) that is the same or slightly larger than the patch or area in which the wheels/tracks contact the ground, and generally less than twice the width of the associated wheel/track. In the case where multiple wheels/tracks of different widths share a common cleared tread path, then the width of the tread path may be the same or slightly larger than the widest wheel/track. Moreover, it should be noted that the tread paths are typically straight-line paths in the travel direction of the work vehicle. It is possible, however, that the system may operate to open and/or close curved or other non-linear tread paths.

Also, the terms "open," "close," "clear," "parting," "spreading" and "converging" are referred to herein with respect to the distribution of the crop material or crop swath. It will be understood for purposes of this disclosure that these terms all refer to movement or distribution of the cut crop material with respect to the tread path or wheel track, either being spread away from it to distribute cut crop material away from (i.e., open or clear or part) a tread path or wheel track in the swath, or spread toward it to distribute cut crop material onto (i.e., close or converge) a previously open or cleared tread path or wheel track. It will also be understood that cut crop material may be moved in the open or clear direction by a "parting device," and that cut crop material may be moved in the close direction by a "converging device," which, as described in detail below, may be the same or different devices. A single device, or multiple devices working together, may provide the associated parting or converging cut crop distribution. It will further be understood that the terms "open," "close," and "clear" do not require absolute or complete covering or uncovering of the tread path or wheel track by cut crop material.

As the machine advances through the swath the device(s) open (or clear off) the narrow tread path just ahead of the one or more leading or front wheels/tracks. The tread path is continuously cleared along the tread path as the work vehicle progresses through the swath. In some embodiments, one or more rear wheels/tracks may be aligned in the travel direction with one or more front wheels/tracks such that they follow the same cleared tread path as the front wheel(s)/track(s). In other embodiments, one or more rear wheels/tracks of the vehicle are not aligned in the travel direction with one or more front wheels/tracks, in which case one or more devices clear one or more different tread paths for the rear wheel(s)/track(s).

In certain embodiments, the system may further include one or more other second crop redistribution devices (e.g., converging devices) that spread the swath over the previously cleared tread path or paths behind the rear wheel(s)/track(s), or behind any individual wheel/track of the machine that does not have a corresponding wheel/track aligned with another wheel/track. The converging device(s) may spread the crop over the previously cleared tread path(s) such that after the work vehicle has passed a given point in the travel direction, there are one or more layers of crop extending in the transverse direction across the entire swath of cut crop. In this way, the system may open and close an advancing tread path at the rate at which the work vehicle traverses the swath in the travel direction. In so doing, the work vehicle may completely or substantially avoid running over the cut crop material in the swath by the ground-engaging wheels or tracks, and thereby avoid any associated damage to the crop or diminution to the swath, which allows for a wide spread swath that may evenly and rapidly dry the crop. With this system, the swath of cut crop deposited by a cutting work vehicle may exceed the width dimension of the work vehicle in the transverse direction, and in some cases, may be a multiple of the width of the work vehicle, such as 1.5 to 2 times the vehicle width, which may correspond to continuous swaths of 40 feet or more, for example.

In other embodiments, rather than clearing a tread path in an existing swath, the crop parting device(s) may be configured to create a clear tread path initially as the work vehicle works the crop within the swath. For example, in the case of a windrower or other cutting machine, the parting device(s) may be a component or components of the machine (e.g., a part of cutter platform) that forms a swath of cut crop, and in so doing, spreads the cut crop in a manner than leaves the narrow tread paths clear of crop forward in the travel direction of the work vehicle. By way of example, the parting devices may be baffles or other blocking elements that deflect or otherwise prevent the cut crop from being spread within the tread paths. As another example, the parting devices may be configured as pick up elements to lift and move cut crop that would have been left within the tread path by the cutting elements. As yet another example, the parting elements may work to redistribute or spread the cut crop in either transverse direction outward from the tread path, which then remains clear until the tread path is covered behind the vehicle as it passes.

In certain embodiments, the parting devices may be defined by their location at a forward position with respect to the work vehicle or a particular wheel/track, and the converging devices may be defined by their location at a rearward position with respect to the work vehicle or a particular wheel/track. As such, the parting and converging devices may be physically similar or even identical components that are distinguished only by their function to either clear crop from the tread path or to spread crop onto the tread path. In yet other embodiments, the parting and converging devices may be different components, specially configured for their crop-clearing or crop-spreading purpose. Although any components suitable to perform the crop-clearing and crop-spreading functions may be used, in certain embodiments one or more of the parting and converging devices may be configured as, or include, a rake, a brush, a belt, a tine, a drum, or a cutting disk, each configured to move the crop material as the work vehicle advances through the swath of cut crop. As applicable, these features may be mounted in a stationary or movable manner with respect the work vehicle to which it is mounted, with the movement being provided by any suitable mechanical connection, including without limitation various hinges, springs, linkages, flexible members and the like, as well as any powered device, including without limitation various electric or hydraulic motors, servos or other actuators. As one example, a converging device may be in the form of a tedding device or "tedder," which, as known in the art, includes one or more tines that rotate or pivot about a mounting hub to rake or sweep the crop. In other embodiments, one or more of the parting or converging devices may operate under fluid power, such as hydraulic or pneumatic device, that effects the clearing or spreading functions. For example, the parting device may be a vacuum system that draws in crop along the tread path, or the converging device may be a forced air system that blows a focused air stream at the swath to move crop along the tread path.

As noted, in certain embodiments it may be possible for the first and second crop redistribution devices (e.g., parting and converging devices) to be of the same or similar construction. However, in certain embodiments (e.g., for certain crops particularly sensitive to uniform dry down, and thus uniform or even crop mat distribution in the crop swath), the converging devices may be configured to work a larger area of the crop swath than compared to the parting devices. In this case, the converging devices may be constructed differently than the parting devices. For example, the converging devices may have an entirely different construction or mode of operation (e.g., mechanical rake parting devices vs. pneumatic converging devices). Alternatively, the parting and converging devices may be of the same type and mode of operation, but be of a different scale (e.g., the converging devices may have wider rakes than the parting devices) or have a different quantity of components (e.g., single rake parting devices vs. multi-rake converging devices). Whatever the case, the converging devices may be configured and arranged to redistribute cut crop from larger areas of the crop swath further transversely inward/outward or forward/rearward of the associated wheel(s) or track(s) to achieve a more uniform redistribution of crop along the tread path, and thus a more uniform cut crop mat across the width of the crop swath.

As alluded to above, in certain other embodiments the system may be configured to effect different tread paths depending on the configuration of the work vehicle, such as having a different wheel count or wheel base at the front than at the rear of the work vehicle. In addition, in certain embodiments, the system may be configured to effect a legacy tread path that remains in the path after the work vehicle passes from the swath. The legacy tread path may have a path width (in the transverse direction), a path count, and a path spacing (also in the transverse direction) that corresponds to another work vehicle that performs a subsequent operation of the harvest. The following work vehicle may be the same or different type of work vehicle with the same or different tread path specifications. However, in the likely event that the following work vehicle is a different machine with different tread path specifications, the system may include one or more auxiliary parting devices that create the legacy tread path in the swath for later traversing along by the following work vehicle. Other auxiliary devices may be provided for tread path closing operations, for example, to close an existing tread path while another auxiliary device opens another tread path that is offset from the one being closed.

This disclosure also provides a crop harvesting work vehicle train with a crop swath wheel/track avoidance system. The work vehicle train includes a lead work vehicle and one or more follower work vehicles in which the lead work vehicle is configured with a system in one or more implementations described above. It should be understood that the lead and follower work vehicles need not be physically or operationally coupled together, nor do they need to be present on the field concurrently. Rather, the work vehicle train need only have the lead work vehicle precede the follower work vehicle(s) at some point in the harvesting process.

In certain embodiments, one or more follower work vehicles may each have its own parting device that clears a tread path ahead of one or more wheels/treads of the associated follower work vehicle. Each follower work vehicle may also have its own converging device that redistributes the crop along its tread path to the rear of the follower work vehicle. However, a given follower work vehicle may precede another follower work vehicle that works the cut crop in the swath in a manner that does not benefit from the swath being redistributed along the tread path. By way of example, the lead work vehicle may be a windrower that opens and closes its tread path to leave behind an undisturbed swath for a follower work vehicle, which may itself be a connected vehicle train in the form of an agricultural tractor towing a crop-working implement, such as a rake. In this case, the parting device of the tractor would open a tread path for the tractor ahead of its wheels/tracks, and then not close the tread path, but rather simply allow the rake implement to work the remaining swath into a narrowed, taller windrow for subsequent processing by a further follower work vehicle, such as a baler implement, which may be tethered to the same tractor train or part of a subsequent follower work vehicle or follower work vehicle train.

In other embodiments, the lead work vehicle, or a preceding follower work vehicle in a train of multiple follower work vehicles, may create a legacy tread path which is traversed by one or more subsequent follower work vehicles. As noted above, the legacy tread path may have the same or different tread path specifications as the tread path of the work vehicle making the legacy tread path. In the preceding example, for instance, the windrower may create a legacy tread path that is narrower than its own for use by the agricultural tractor that tows the rake implement.

These and other aspects of the disclosure will now be described with respect to various examples illustrated in the drawings. While a windrower work vehicle with a cutting platform may be detailed herein, windrowers of other configurations (e.g., with various draper platforms) may also incorporate the system disclosed herein as may crop-working vehicles other than windrowers, such as various agricultural tractors, sprayers, planters, harvesters, mowers, mower-conditioners, and tillage implements. Thus, it should be understood that the work vehicles, in terms of their construction and/or operation, shown in the drawings and described below are merely examples and do not limit this disclosure.

Figure 2:
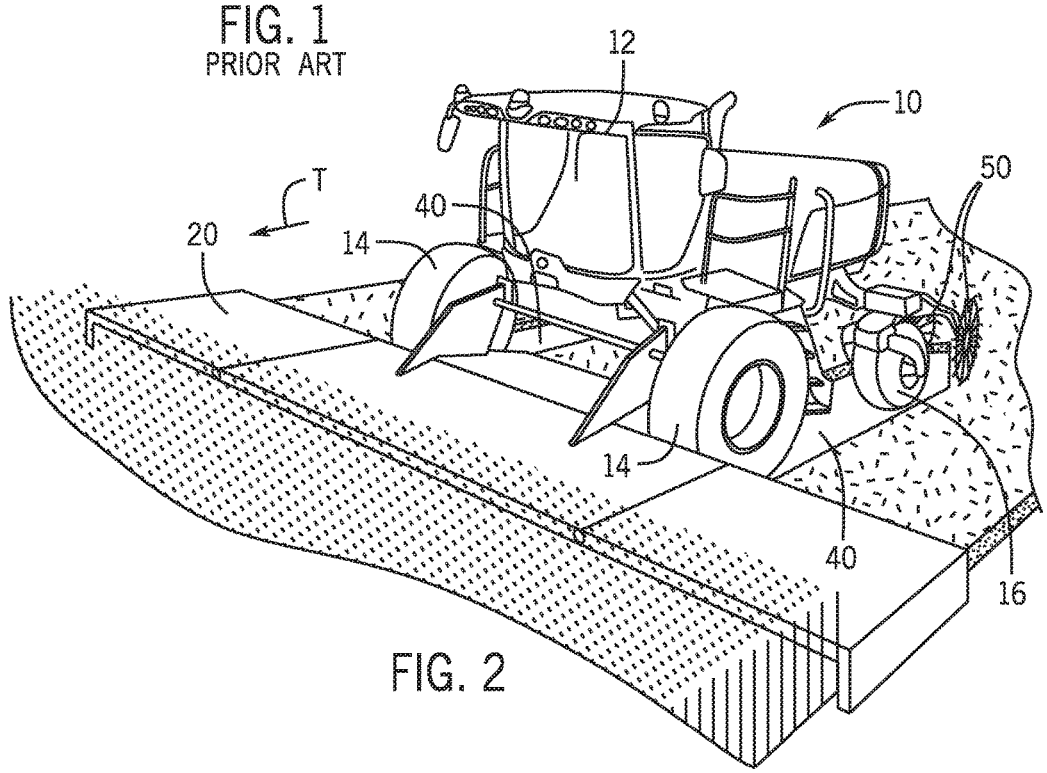
FIG. 2 is a perspective view of an example work vehicle in the form of a windrower with a cutting head in which the crop swath wheel/track avoidance system of this disclosure may be incorporated.

Referring now to FIG. 2, an example work vehicle 10 is depicted. As shown, the work vehicle 10 may be an agricultural windrower having an operator cabin 12 from which an operator may control the operation of the work vehicle 10. A steering input device, such as a steering wheel, may be included in the operator cabin 12, such that an operator may direct the steering of the work vehicle 10 by providing manual steering input. It will be understood that other steering input devices (e.g., levers, joysticks, touch-screen devices, and so on) may additionally (or alternatively) be utilized. Various other input devices may be also provided within the operator cabin 12. By way of example, a hydraulic system control device (e.g., a hydraulic control lever) may be provided for transitioning the vehicle between various operating modes (e.g., between an active operating mode in which various hydraulic systems are operating, a parked mode in which the vehicle is in an energized state but various hydraulic systems may not be operating, and so on).

A pair of front wheels 14, spaced apart and aligned in the transverse direction, may be fixed in a forward-facing orientation with respect to a travel direction T of the work vehicle 10 (i.e., may not pivot with respect to the work vehicle 10), and may be independently driven by respective hydrostatic machines to steer the front of the work vehicle 10. For example, a hydraulic drive circuit for each of the front wheels 14 may include two different hydraulic (or other) machines, such as a hydraulic pump driven by an engine of the vehicle 10, and a hydraulic motor driven by the hydraulic pump. The motor-pump pairings of the respective drive circuits may accordingly be used to drive the left-side and right-side front wheels 14 at independent (and, potentially, different) rotational speeds. In this way, although the front wheels 14 may not pivot with respect to the work vehicle 10, the front wheels 14 may be steered (and may steer the vehicle 10) based upon the difference in speed between the left-side front wheel 14 and the right-side front wheel 14 (e.g., as controlled by the left-side and right-side hydraulic drive circuits, respectively). Rear wheels 16 may also be steerable wheels, although the rear wheels 16 may be configured differently from the front wheels 14. For example, the rear wheels 16 may be mounted on casters, which may allow the wheels 16 to rotate independently of each other and of a fixed rear-wheel support. In the configuration depicted, if the rear wheels 16 and the casters are allowed to rotate freely, they may generally track turns of the vehicle 10 as it is otherwise steered (e.g., as the motors provide different speeds to each of the front wheels 14), but without the rear wheels 16 providing any active steering for the work vehicle 10. It will be understood that various other configurations of the front 14 and rear 16 wheels may be possible.

The work vehicle 10 may have an implement for working the crop material. For example, the work vehicle 10 has a header 20 mounted to the chassis of the machine for cutting the crop to separate it from the ground. In this example, the header 20 is a wide, folding header with hinges and suitable powered actuators for folding and unfolding the outer ends of the header 20 between a raised, transport orientation and a lowered, operational orientation. The example header 20 includes a series of rotating cutting disks 24 arranged along the width of the header 20 to cut the crop close to the ground. Once severed, the cutting disks 24 throw the cut crop according to their individual rotational direction and ultimately rearward away from the travel direction T of the work vehicle 10.

The header 20 also includes two first crop redistribution devices in the form of parting devices 30, which are mounted to the chassis of the machine via the header 20, and which in the illustrated example each include an arrangement of rotating drums 32 and deflector baffles 34. Since the swath of cut crop is being originated by the header 20, the parting devices 30 may need only provide a fixed surface that impedes or deflects the cut crop leaving the cutting disks 24 at the appropriate position and spanning the appropriate transverse distance. The drums 32 may thus be used to clean up any cut crop that inadvertently is not deflected by the baffles 34 sufficiently. Alternatively, the drums 32 may be the primary mechanisms for picking up and carrying away crop material in front of the wheels 14, in which case the baffles 34 may provide a back-up shroud for the drums 32, or even omitted entirely. The drums 32 may be powered components that are rotated under power from an electric or hydraulic system of the work vehicle 10, or the drums 32 may be unpowered components that are configured to rotate in a single clock direction by mechanical action (e.g., by gearing and/or a roller in contact with the ground). Alternatively, single powered or unpowered drums may instead be pairs or sets of multiple drums for one or each wheel, which counter-rotate or rotate in different clock directions with respect to one or more other drums of the parting device for the associated wheel. The parting devices 30 are situated within the header 20 ahead (relative to the travel direction T) of the front wheels 14 to clear crop from two generally parallel and even-width strips of ground that constitute a pair of tread paths or a single two-wheel/track tread path 40. Various powered or unpowered position adjustment mechanisms may be provided to alter the position and/or orientation of the parting devices 30 in the transverse and/or travel directions.

As shown, the tread path 40 is originated at the header 20 ahead of the front wheels 14 and progresses in the travel direction T as the work vehicle advances through the field, and since in the illustrated example the rear wheels 16 are aligned with the front wheels 14, both sets of wheels travel along the cleared tread path 40 rather than upon the swath of cut crop. Further, in the illustrated example, the front wheels 14 are larger (both in diameter and width) than the rear wheels 16, and thus, the tread path 40 created by the parting devices 30 is sized according to the front wheels 14, either the same width or slightly larger. Each strip of the tread path 40 is thus considerably narrow relative to the overall swath of cut crop resulting from the header 20.

At the rear of the work vehicle 10 are second crop redistribution devices in the form of converging devices 50 mounted to the chassis to move cut crop along the tread path behind the rear wheels 16. As described further below, the converging devices 50 may be powered or unpowered components of various configurations provided that they are configured and arranged to spread or otherwise re-distribute crop from the cut crop swath onto and along the tread path 40 behind the rear wheels 16. The work vehicle 10 thus forms a wide swath of cut crop generally extending in the transverse direction between the outer sides of the header 20, and thus both entirely within the wheel base of the work vehicle 10 and outward beyond lateral sides of the work vehicle 10. In this way, with the disclosed system, the work vehicle 10 can not only cut a wider swath of crop in a single pass than conventional windrowers (e.g., 40 feet or more), it can also distribute the cut crop generally evenly over the field in a thinner mat or layer utilizing all or nearly all of the available field. This aids in achieving a more uniform and rapid dry down of the cut crop, and thereby higher useful crop yield (i.e., less nutrient loss or degradation caused by moisture- or sun-related damage).

Referring now also to FIGS. 3A-3F, various example converging devices for the aforementioned example windrower work vehicle 10 will be described. Generally, the example converging devices are, or include, a rake, a brush, a belt, a tine, a drum, a cutting disk, or an air-moving component, each being configured and oriented with respect to the work vehicle 10 to redistribute the cut crop (i.e., by moving cut crop from the crop swath that is either ahead of or behind an associated wheel of the work vehicle 10 relative to the travel direction T in a generally transverse direction) to the tread path 40 as the work vehicle 10 advances along the tread path 40. Although shown in a simplified manner, it will be understood that the example converging devices may be mounted in a stationary or movable manner with respect the work vehicle 10, and with any movement being provided by any suitable mechanical connection, including without limitation various hinges, springs, linkages, flexible members and the like, as well as any powered device, including without limitation various electric or hydraulic motors, servos or other actuators.

One or more of the converging devices may be, or may include, a rake component. For example, as shown in FIG. 3A, a converging device 50A may be a wheel rake. Although wheel rakes may come in various configurations, as an example, the wheel rake may have a solid or spoked disk-like hub of a suitable outer diameter along which a series of spaced-apart projections or fingers may extend (radially and/or axially) outward. The fingers contact cut crop from the crop swath and pull it toward and across the tread path 40. As depicted, the example wheel rake may be arranged behind an associated rear wheel 16 and oriented at an oblique angle with respect to the travel direction T to pull cut crop from areas of the crop swath adjacent to the tread path 40 and sweep it across the tread path 40 before releasing it. In the example, the wheel rake will rotate about a generally transverse oblique axis. The wheel rake may rotate continuously under power (e.g., via electric or hydraulic motors), be driven to rotated by mechanical contact with (e.g., via a tire) an associated wheel, or be allowed to freewheel, turning mechanically through contact with the ground as the work vehicle 10 traverses the field. As shown in FIG. 3A, a single wheel rake may be provided behind each rear wheel 16. However, multiple rakes may work in concert for each rear wheel 16, such as the pair of oppositely angled wheel rakes shown in FIG. 2.

Alternatively or additionally, one or more of the converging devices may be, or may include, a brush component. For example, as shown in FIG. 3B, a converging device 50B may be a brush wheel with outwardly extending bristles that rotate about a generally vertical (or near vertical) axis. As depicted, similar to the example wheel rake, the example brush wheel may be arranged behind an associated rear wheel 16 to pull cut crop from areas of the crop swath adjacent to the tread path 40 and sweep it across the tread path 40 before releasing it. The brush wheel may rotate continuously under power (e.g., via electric or hydraulic motors), although a freewheeling brush arrangement may also be possible such as if configured as a transverse roller brush that turns about a generally transverse axis by contact with the ground as the work vehicle 10 traverses the field. A single brush wheel may be provided behind each rear wheel 16. However, multiple brushes may work in concert for each rear wheel 16, such as a pair of counter-rotating brushes arranged generally along the transverse edges each strip of the tread path 40.

Figure 3C:
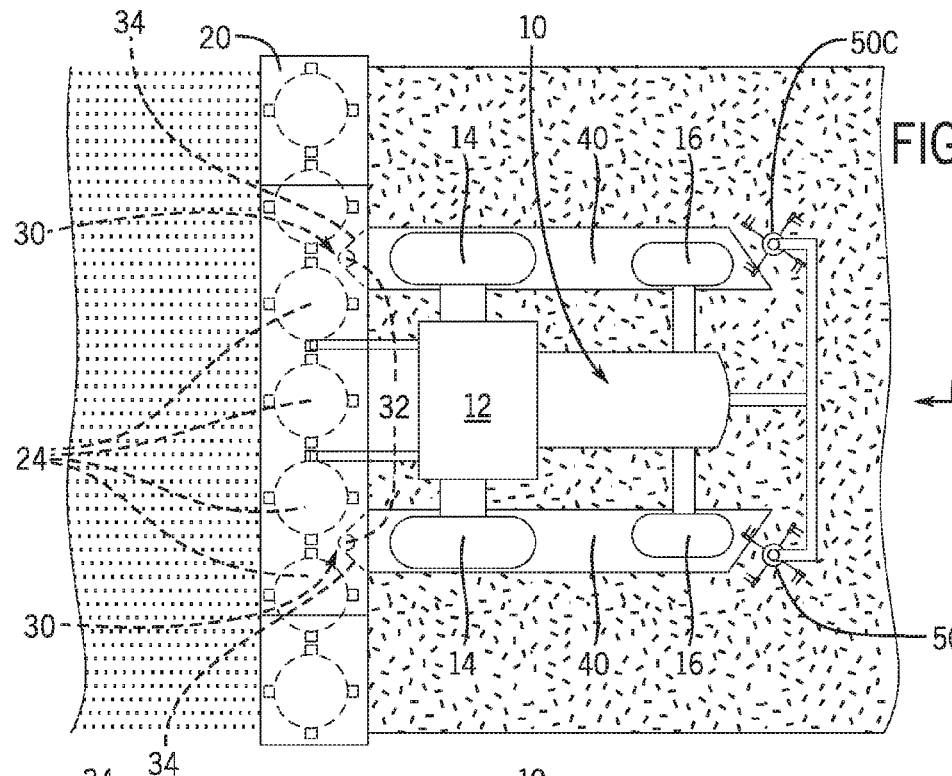

Alternatively or additionally, one or more of the converging devices may be, or may include, a tine component. For example, as shown in FIG. 3C, a converging device 50C may be a tedding device or "tedder," which, as known in the art, includes one or more tines that rotate or pivot about a mounting hub to rake or sweep the cut crop. As shown, an example tedder converging device 50C may have multiple tine forks (e.g., four) that all rotate about a generally upright axis, which may be slightly canted from vertical to spread and release the cut crop material. Similar to the other examples, the example tedder may be arranged behind an associated rear wheel 16 to pull cut crop from areas of the crop swath adjacent to the tread path 40 and sweep it across the tread path 40 before releasing it. The tedder may rotate continuously under power (e.g., via electric or hydraulic motors) or be driven mechanically by contact with a wheel (e.g., a tire), or a freewheeling tedder arrangement may be provided that turns by contact with the ground as the work vehicle 10 traverses the field.

Figure 3D:
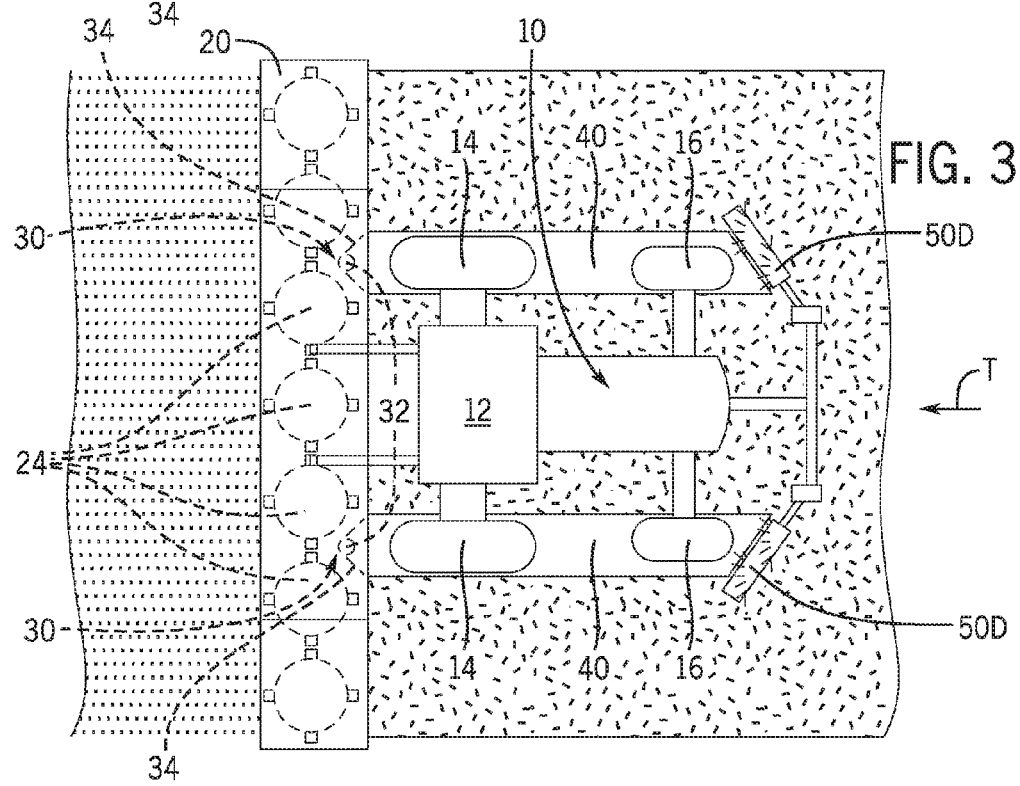

Alternatively or additionally, one or more of the converging devices may be, or may include, a drum component. For example, as shown in FIG. 3D, a converging device 50D may be a roller drum with one or more projections, such as spaced-apart individual prongs or a spiral auger-like paddles (as shown), in which the roller drum rotates about a generally transverse axis. As depicted, the example roller drum may be arranged behind an associated rear wheel 16 and oriented at an oblique angle with respect to the travel direction T to pull cut crop from areas of the crop swath adjacent to the tread path 40 and sweep it across the tread path 40 before releasing it. Like the other examples, the roller drum may rotate by contact with the ground as the work vehicle 10 traverses the field. However, it may also be rotated continuously under power (e.g., via electric or hydraulic motors), or be driven mechanically by contact with a wheel (e.g., a tire). Also, a single roller drum may be provided behind each rear wheel 16, or multiple roller drums may work in concert for each rear wheel 16. Other converging drum arrangements may be provided as well, such as a pair of counter-rotating drums arranged generally along the transverse edges each strip of the tread path 40 which rotate about generally parallel vertical (or near vertical) axes.

Figure 3E:
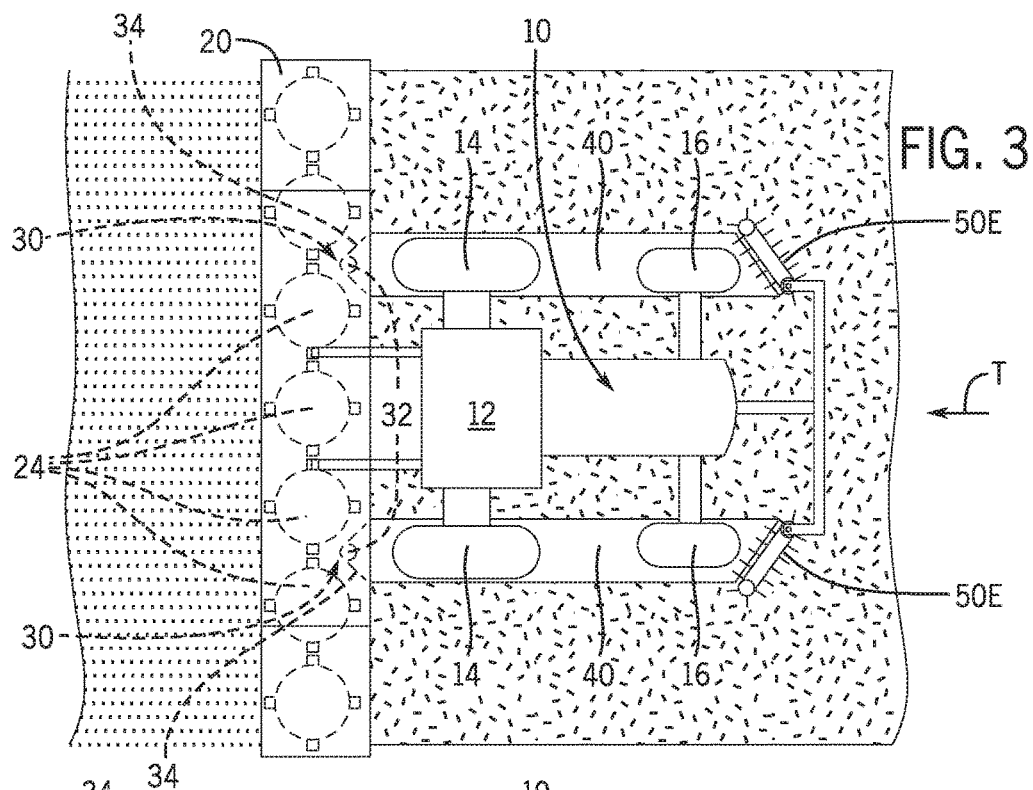

Alternatively or additionally, one or more of the converging devices may be, or may include, a belt component. For example, as shown in FIG. 3E, a converging device 50E may be a pick-up belt or conveyor with spaced apart projections or paddles that rotates about generally vertical (or near vertical) axes. As depicted, the example pick-belt may be may be arranged behind an associated rear wheel 16 and oriented at an oblique angle with respect to the travel direction T to pull cut crop from areas of the crop swath adjacent to the tread path 40 and sweep it across the tread path 40 before releasing it. The belt may be rotated continuously under power (e.g., via electric or hydraulic motors), or be driven mechanically by contact with a wheel (e.g., a tire), and a single pick-up belt may be provided behind each rear wheel 16, or multiple belts may work in concert for each rear wheel 16.

Figure 3F:
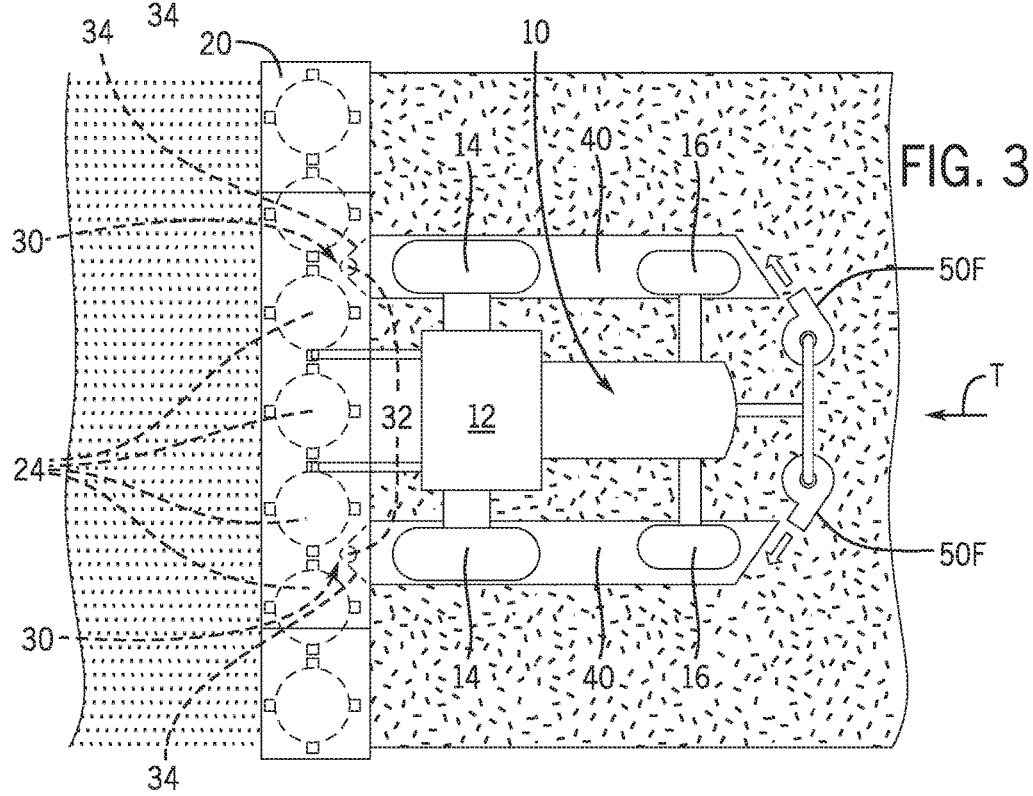

Alternatively or additionally, one or more of the converging devices may be, or may include, a pneumatic component. For example, as shown in FIG. 3F, a converging device 50F may be a powered forced air system that blows a focused air stream at the swath to move cut crop onto and along the tread path 40. Negative pressure or vacuum air systems may also be used in which cut crop is drawn in from the crop swath and deposited onto the tread path 40. Such pneumatic may include various air flow pumps and compressors, air flow control valves, baffles, dampers and nozzles, as well as various adjustment mechanisms and actuators, as needed to control and focus the air to achieve the desired distribution of the cut crop.

Various other alternative configurations for the converging devices than those shown and described are also envisioned within the scope of this disclosure.

As noted above, in certain embodiments, the parting devices 30 and the converging devices 50 may be defined by their location at a forward or rearward position with respect to the work vehicle 10 or a particular wheel/track, and thus may be physically similar or even identical components that are distinguished only by their function to either clear crop from the tread path or to spread crop onto the tread path. Thus, although not shown in the drawings as such, it will be understood that in certain embodiments, rather than being differently configured components that are part of a header or other platform, the parting devices of a particular work vehicle may be the same as, or similar to, one or more of the various example devices shown in FIGS. 3A-3F as the converging devices. However, of course, the parting devices will be mounted to the work vehicle at an appropriate forward position ahead of the associated wheel(s)/track(s) and at an orientation with respect thereto that facilitates the tread path clearing function.

Figure 4:
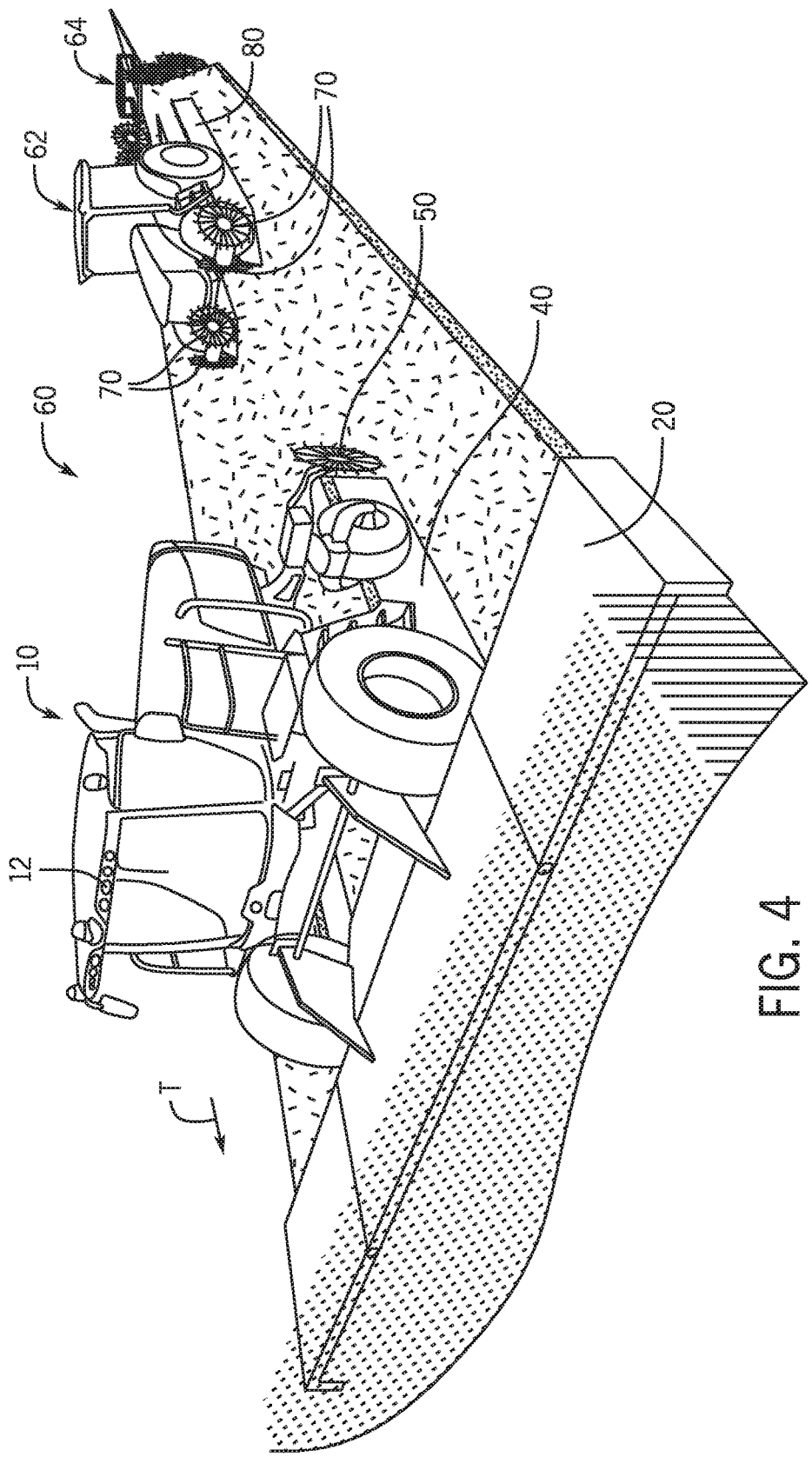
FIG. 4 is a perspective view of an example work vehicle train, including a lead work vehicle in the form of a windrower and a follower vehicle in the form of an agricultural tractor towing a wheel rake implement, in which the crop swath wheel/track avoidance system of this disclosure may be incorporated.

This disclosure also provides a crop harvesting work vehicle train with a crop swath wheel/track avoidance system. Referring now to FIG. 4, an example work vehicle train 60 incorporating the disclosed crop swath wheel/track avoidance system will now be detailed. The example work vehicle train 60 includes a lead work vehicle, such as the windrower work vehicle 10 configured with the disclosed system in one or more implementations as described above, and one or more follower work vehicles. In the example, there is one follower work vehicle, which itself is a work vehicle train, in the form of an agricultural tractor 62 towing a wheel rake implement 64, which may be conventional machines other than for the provision of the disclosed crop swath avoidance system. In this example, the lead and follower work vehicles are not physically coupled together such that they may or may not work the field concurrently provided only the lead work vehicle precedes the follower work vehicle at some stage in the harvesting or other treatment process.

Figure 5A:
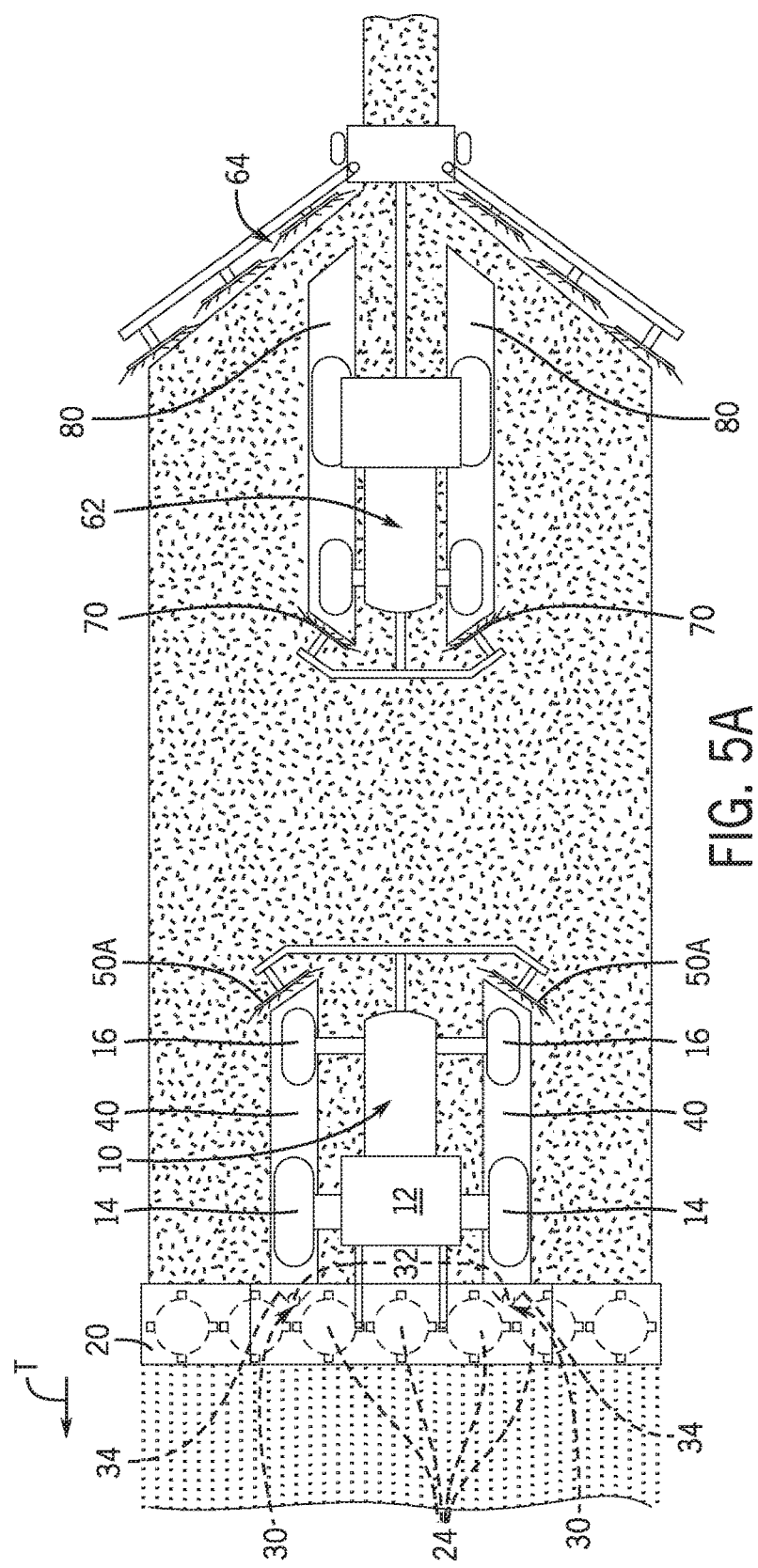
FIGS. 5A and 5B are top schematic views of the work vehicle train of FIG. 1 depicting example alternative arrangements for clearing a tread path for one or more follower work vehicles.

In some cases, the follower work vehicle(s) may have their own parting devices that clear a tread path ahead of the wheels/tracks, as well the follower work vehicles may have their own converging devices that redistribute the cut crop along its tread path to the rear of the follower work vehicle. In the example shown in FIG. 5A, the lead work vehicle 10 opens and closes its tread path 40 to leave behind an undisturbed full-width swath of cut crop for drying and subsequent processing by the follower work vehicle. Parting devices 70 mounted to the tractor 62 open a wheel-wide, parallel strip tread path 80 for itself ahead of its wheels/tracks. In this example, the parting devices 70 for the tractor 62 are wheel rakes, either a single rake for each front wheel as shown in FIG. 5A or a double rake arrangement for each front wheel as shown in FIG. 4. However, the tractor 62 may have parting devices configured in various other forms, such as described above. In this example, the tractor 62 does not include converging devices to close the tread path 80, but rather simply allows the wheel rake implement 64 to work the remaining swath into a narrowed, taller windrow for further processing by a subsequent follower work vehicle (e.g., another tractor and baler train (not shown)) in the work vehicle train.

Figure 5B:
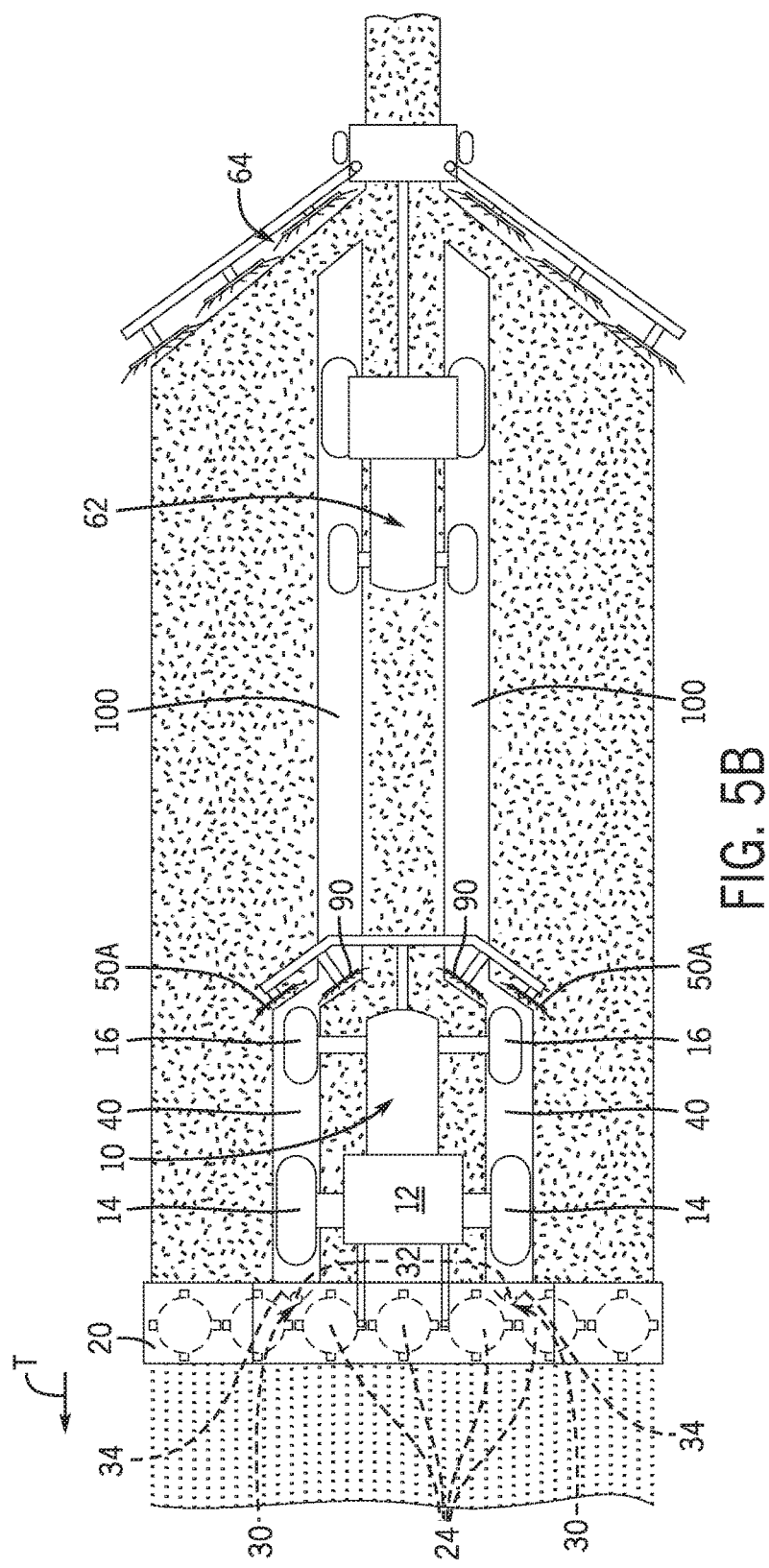

Alternatively, in other embodiments, the lead work vehicle (or a preceding follower work vehicle in a train of multiple follower work vehicles) may create a legacy tread path that is traversed by one or more subsequent follower work vehicles. For example, as shown in FIG. 5B, the lead work vehicle 10 may include a set of auxiliary parting devices 90 mounted at the rear of the machine. The auxiliary parting devices are mounted, either fixedly or adjustably, to the lead work vehicle 10 to create a legacy tread path 100 that has strip width and spacing specifications that correspond to the wheel/tracks and wheel base one or more of the follower work vehicles. One or more additional sets of auxiliary parting devices may be added to the lead work vehicle (or another follower work vehicle) to create one or more additional legacy tread paths for other follower work vehicles. In this example, the auxiliary parting devices 90 are single wheel rakes, however, they may be configured in various other forms, as described above.

In still other embodiments, the redistribution devices may vary in type or quantity from one side of a vehicle or vehicle train relative to another side of the vehicle or vehicle train. By way of example, a tractor may tow a mower-conditioner implement (not shown) such that the implement follows a path in the travel direction with its tread paths transversely offset from that of the tractor (e.g., the implement is towed behind and to a side of the tractor). The tractor may follow the tread paths previously laid by the implement and have redistribution devices to close those tread paths behind the tractor. The tractor may have identical redistribution devices on the left and right sides of the tractor, such as a pair of rakes behind each rear wheel that spread cut crop from both sides of the associated wheel, or it may have a single rake behind each rear wheel with the rakes generally aligned in parallel. However, in an offset vehicle train such as described, it may be advantageous for the redistribution devices to be different on the left and right sides of the tractor. For example, at the far-side wheel a pair of rakes may be used to close the tread path by spreading cut crop from windrows at both sides of the wheel in order to achieve thorough coverage. However, at the implement-side wheel, it may be better to use a single rake to close the tread path by spreading cut crop from the windrow between the rear wheels, without contacting uncut crop ahead of the implement at the implement side of the associated wheel.

The legacy tread path(s) may have the same or different tread path specifications as the tread path of the work vehicle making the legacy tread path. In the illustrated example, for instance, the windrower lead work vehicle 10 may create the legacy tread path 100 to be narrower than its own for use by the tractor 62. As shown, this creates a transverse offset (or non-alignment in the travel direction T) of the tread paths 40 and 100, the amount of offset varying depending on the wheel base and wheel size of the corresponding leader and follower work vehicles in the work vehicle train.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A work vehicle for working a swath of crop, comprising:

a front ground-engaging wheel or track mounted to the work vehicle and a rear ground-engaging wheel or track mounted to the work vehicle, the front and rear ground-engaging wheels or tracks being movable in a travel direction along a tread path;

a parting device mounted to the work vehicle to move crop that is ahead of the front ground-engaging wheel or track relative to the travel direction; and a converging device mounted to the work vehicle to move crop that is behind the rear ground-engaging wheel or track relative to the travel direction;

wherein the parting device opens the swath of crop along substantially only the tread path ahead of the front ground-engaging wheel or track relative to the travel direction and the converging device closes the swath of crop along the tread path behind the rear ground-engaging wheel or track relative to the travel direction.

2. The work vehicle of claim 1, wherein the parting device is a part of a cutting head mounted to the work vehicle ahead of the front ground-engaging wheel or track relative to the travel direction; and wherein the swath of crop is cut by the cutting head.

3. The work vehicle of claim 2, wherein the swath of crop cut by the cutting head extends in a transverse direction perpendicular to the travel direction beyond lateral sides of the work vehicle.

4. The work vehicle of claim 2, wherein each of the parting device and the converging device includes at least one of a rake, a brush, a belt, a tine, a drum, a cutting disk, and an air-mover.

5. The work vehicle of claim 1, further including an auxiliary parting device mounted to the work vehicle;

wherein the auxiliary parting device is configured to open the swath of crop along a follower tread path for at least one ground-engaging wheel or track of a follower work vehicle.

6. The work vehicle of claim 1, further including:

a second front wheel or track and a second rear wheel or track;

wherein the second front wheel or track and the second rear wheel or track are mounted to the work vehicle to be aligned along a second tread path in the travel direction spaced from the tread path and to be aligned with the front wheel or track and the rear wheel or track, respectively, in a transverse direction perpendicular to the travel direction.

7. The work vehicle of claim 6, further including:

a second parting device mounted to the work vehicle to move crop that is ahead of the second front wheel or track relative to the travel direction and a second converging device mounted to the work vehicle to move crop that is behind the second rear wheel or track relative to the travel direction;

wherein the second parting device opens the swath of crop along substantially only the second tread path ahead of the second front wheel or track relative to the travel direction and the second converging device closes the swath of crop along the second tread path behind the second rear wheel or track relative to the travel direction.

8. The work vehicle of claim 7, further including a set of auxiliary parting devices mounted to the work vehicle;

wherein the set of auxiliary parting devices is configured to open the swath of crop along substantially only parallel follower tread paths that are spaced apart in a transverse direction perpendicular to the travel direction to correspond to a wheel base of a set of ground-engaging wheels or tracks of a follower work vehicle.

9. The work vehicle of claim 8, wherein at least one of the follower tread paths is offset from at least one of the tread path and the second wheel or track in the transverse direction perpendicular to the travel direction.

10. The work vehicle of claim 5, wherein the follower work vehicle is not physically coupled to the work vehicle to which the auxiliary parting device is mounted.

11. The work vehicle of claim 8, wherein the follower work vehicle is not physically coupled to the work vehicle to which the auxiliary parting devices are mounted.

12. A work vehicle for working a swath of crop, comprising:

a pair of front ground-engaging wheels or tracks mounted to the work vehicle and movable in a travel direction along parallel tread paths and a pair of rear ground-engaging wheels or tracks mounted to the work vehicle to be movable in the travel direction along the tread paths;

a pair of parting devices mounted to the work vehicle to move crop that is ahead of the front ground-engaging wheels or tracks relative to the travel direction; and a pair of converging devices mounted to the work vehicle to move crop that is behind the rear ground-engaging wheels or tracks relative to the travel direction;

wherein the parting devices open the swath of crop along substantially only the tread paths ahead of the front ground-engaging wheels or tracks relative to the travel direction and the converging devices close the swath of crop along the tread paths behind the rear ground-engaging wheels or tracks relative to the travel direction.

13. The work vehicle of claim 12, wherein the parting devices are a part of a cutting head mounted to the work vehicle ahead of the front ground-engaging wheels or tracks relative to the travel direction; and wherein the swath of crop is cut by the cutting head.

14. The work vehicle of claim 12, wherein each of the parting device and the converging device includes at least one of a rake, a brush, a belt, a tine, a drum, a cutting disk, and an air-mover.

15. The work vehicle of claim 12, further including a set of auxiliary parting devices mounted to the work vehicle;

wherein the set of auxiliary parting devices is configured to open the swath of crop along substantially only parallel follower tread paths that are spaced apart in a transverse direction perpendicular to the travel direction to correspond to a wheel base of a set of ground-engaging wheels or tracks of a follower work vehicle.

16. The work vehicle of claim 15, wherein at least one of the follower tread paths is offset from at least one of the tread path and the second wheel in the transverse direction perpendicular to the travel direction.

17. The work vehicle of claim 15, wherein the follower work vehicle is not physically coupled to the work vehicle to which the auxiliary parting devices are mounted.

18. A work vehicle train for working a swath of crop, comprising:

a lead work vehicle, including:

a front ground-engaging wheel or track mounted to the lead work vehicle and a rear ground-engaging wheel or track mounted to the lead work vehicle, the front and rear ground-engaging wheels or tracks being movable in a travel direction along a lead tread path;

a parting device mounted to the lead work vehicle to move crop that is ahead of the front ground-engaging wheel or track of the lead work vehicle relative to the travel direction; and a converging device mounted to the lead work vehicle to move crop that is behind the rear ground-engaging wheel or track of the lead work vehicle relative to the travel direction;

wherein the parting device opens the swath of crop along substantially only the lead tread path ahead of the front ground-engaging wheel or track of the lead work vehicle relative to the travel direction and the converging device closes the swath of crop along the lead tread path behind the rear ground-engaging wheel or track of the lead work vehicle relative to the travel direction;

a follower work vehicle including at least one ground-engaging wheel or track mounted to the follower work vehicle and movable in the travel direction along a follower tread path; and an auxiliary parting device mounted to at least one of the lead work vehicle and the follower work vehicle and configured to open the swath of crop along substantially only the follower tread path ahead of the at least one ground-engaging wheel or track of the follower work vehicle relative to the travel direction.

19. The work vehicle train of claim 18, wherein the auxiliary parting device is mounted to the follower work vehicle to move crop that is ahead of the at least one ground-engaging wheel or track of the follower work vehicle in the travel direction.

20. The work vehicle train of claim 18, wherein the auxiliary parting device is mounted to the lead work vehicle and not physically coupled to the auxiliary parting device.

* * * * *